F. H. HEHEMANN.
GAUGE COCK.
APPLICATION FILED JAN. 23, 1920.
1,409,176.
Patented Mar. 14, 1922.
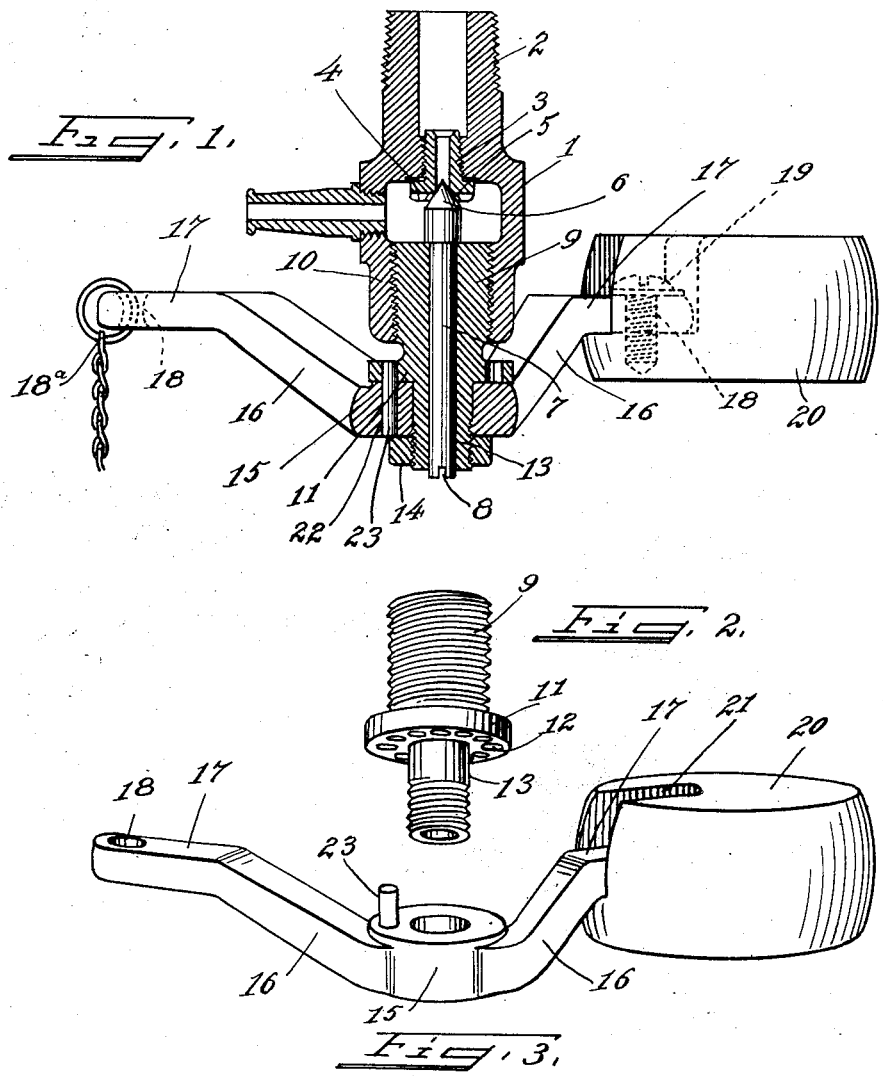
Inventor
Frederick H. Hehemann
By
Attorneys.

UNITED STATES PATENT OFFICE.

FREDERICK H. HEHEMANN, OF CINCINNATI, OHIO, ASSIGNOR TO THE LUNKENHEIMER COMPANY, OF CINCINNATI, OHIO, A CORPORATION OF OHIO.

GAUGE COCK.

1,409,176.  Specification of Letters Patent.  Patented Mar. 14, 1922.

Application filed January 23, 1920. Serial No. 353,637.

*To all whom it may concern:*

Be it known that I, FREDERICK H. HEHEMANN, a citizen of the United States, and a resident of the city of Cincinnati, in the county of Hamilton and State of Ohio, have invented certain new and useful Improvements in Gauge Cocks, of which the following is a full, clear, and exact description, reference being made to the accompanying drawings, forming a part of this specification.

My invention relates to gauge cocks, used primarily in connection with water and steam indication for boilers, and the like.

The devices of the past have not provided a standard type of gauge cock, which will adapt itself with simple adjustments to the requirements of boiler gauge cock installations, and it is the object generally of my invention herein to provide a cock mechanism with the desirable adjustable features.

The object of my invention I accomplish by that certain construction and arrangement of parts to be hereinafter more specifically pointed out and claimed.

In the drawings,

Figure 1 is a central longitudinal section taken through the device.

Figure 2 is a perspective view of the main fitting.

Figure 3 is a perspective view of the reversible lever handle.

The valve in the form selected by me for illustration of my invention has a casing 1, provided with a threaded end 2 for attachment in the side of a boiler or the like. It has also a spout to serve as the outlet, through which the water or steam will flow.

The valve seat member 3 is a standard, threaded, removable part, threaded into the end 2 of the valve casing, and slotted at 4 for engagement by a screw driver. The valve seat proper is formed in a depression 5 in the forward end of the member, and the periphery of said end is preferably hexagonal to permit use of a socket wrench.

The valve in the particular embodiment is a tapered plug 6 having a stem 7, said stem being provided with a slotted end 8.

The main fitting of the valve, which guides and mounts the stem and operates the valve and is itself controlled by the lever handle, is formed of a threaded member 9 which engages in the threaded socket or sleeve 10 of the valve casing. On its outer end the fitting has formed integrally therewith a disk 11, which has peripheral perforations 12 therein, for a purpose to be described.

The end 13 of the fitting beyond the disk, is threaded to receive a nut 14, and the entire fitting is cored out to slidably and rotatably retain the valve stem 7, and to expose the slotted end of said stem. The plug of the valve is wider than the stem and hence abuts against the inner end of the portion 9 of the fitting, so that the turning in of the fitting will force the valve plug against its seat.

The above noted parts together with an operating handle on the fitting, provide an excellent gauge cock, which has a regrinding function, due to the fact that the application of a screw driver to the end of the stem will permit of the rotation of the stem and hence the grinding of the valve seat, by means of the plug itself. All of the parts are easily produced, assembled or replaced and when properly adjusted will not leak.

The handle itself forms an important part of my invention. It is in the form of a lever, fulcrumed at the center thereof, and has thus a central collar or intermediate portion 15 to engage over the end of the fitting and two arms 16, 16, each of them being bent at an angle away from the collar portion, and terminating in straight ends 17.

The ends of the arms are both provided with a hole 18, which permits the passage of a securing screw 19 for the weight 20. This weight may be of any desired form, although a circular weight having a groove 21 for receiving the ends of the lever arms is preferred. The attaching screw passes through the holes in said ends and thence into a suitable threaded socket in the weight.

As will now be apparent, the weight may be mounted on either arm, or omitted altogether, and an operating cord attached in each hole 18. In customary practice one hole is used for the weight and the other for the operating cord or wire, as at 18ª.

The collar portion of the lever is adapted to abut against the perforated disk on the fitting, and said collar portion is perforated by on open ended hole 22, which receives a pin 23, that may be driven through the collar so as to protrude from either side thereof.

When mounted on the fitting, the pin is driven so that its end will engage in one of the holes in the disk, and thus the operation of the handle controls the fitting and hence the valve. The perforated disk serves as a clutch device for engagement by the collar portion of the lever. The nut 14 when screwed down on the end of the fitting retains the lever in place, and holds the pins against retractile movement.

The lever is of a shape such that if two of the cocks are placed one above the other, the lever on one of the cocks may be reversed from the lever on the other and thus will provide different planes of movements for the levers of the two cocks. To reverse one of the levers, it is moved from the fitting, turned over, the pin driven through to the opposite side from which it had been located, and the lever then remounted, as before.

It is readily apparent that the construction above described provides a gauge cock, which has a reversible special shaped cross bar lever, with a weight which is removable or shiftable from one side to the other, and in which the position of the weighted arm when the cock is closed, can be readily adjusted with relation to the perforations in the fitting disk.

Having thus described my invention, what I claim as new and desire to secure by Letters Patent, is:—

1. In a gauge cock, the combination with a valve casing and means therein for operating a valve, and an operating lever, means for securing said lever to the valve operating means, intermediate the ends of said lever, and a weight element, both of said ends of the lever being similar and having means for mounting the weight element on either end.

2. In a gauge cock, the combination with a valve casing and means therein for operating a valve, an operating lever, said lever being formed with an intermediate portion for mounting on the valve operating means the arms of the lever extending angularly from said intermediate portion, and means for effecting the mounting of the lever intermediate portion, said intermediate portion being both reversible and adjustable circumferentially.

3. In a gauge cock, the combination with the valve operating member of a lever for operating said member, said lever having an intermediate portion and arms extending angularly therefrom, said lever adapted to be reversed, a clutching device on the valve operating member, and means on the intermediate portion of the lever for engaging said clutch device in either position of adjustment of the lever.

4. In a gauge cock, the combination with the valve operating member of a lever for operating said member, a perforated element on the valve operating member, said lever comprising an intermediate portion, said portion having a hole therethrough and having arms extending angularly therefrom whereby the lever may be reversed, and a pin of a length to protrude from either end of the hole according to the adjustment of the lever in either of its two positions and adapted to engage in the said perforated element.

5. In a gauge cock, the combination with the valve operating member, of a lever for operating said member, a perforated element on the valve operating member, said lever comprising an intermediate portion, said portion having a hole therethrough, and a pin of a length to protrude from either end of the hole according to its adjustment and adapted to engage in the said perforated element, said lever comprising arms extending angularly from the intermediate portion in opposite directions and operable from either end.

6. In a gauge cock, the combination with the valve operating member, of a lever for operating said member, a perforated element on the valve operating member, said lever comprising an intermediate portion, said portion having a hole therethrough, and a pin of a length to protrude from either end of the hole according to its adjustment and adapted to engage in the said perforated element, said lever comprising arms extending angularly from the intermediate portion, and means on the free end of each of said arms for removably mounting a weight thereon.

FREDERICK H. HEHEMANN.